United States Patent
Boehler et al.

(10) Patent No.: US 7,062,974 B2
(45) Date of Patent: Jun. 20, 2006

(54) PRESSURE TRANSMITTER

(75) Inventors: Ewald Boehler, Wolfach (DE); Jorn Jacob, Wolfach (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 10/312,975

(22) PCT Filed: Jun. 28, 2001

(86) PCT No.: PCT/EP01/07442

§ 371 (c)(1),
(2), (4) Date: May 6, 2003

(87) PCT Pub. No.: WO02/04910

PCT Pub. Date: Jan. 17, 2002

(65) Prior Publication Data

US 2004/0020300 A1    Feb. 5, 2004

(30) Foreign Application Priority Data

Jun. 30, 2000 (DE) ................... 100 31 120

(51) Int. Cl.
*G01L 19/04* (2006.01)

(52) U.S. Cl. .................. 73/708; 73/706; 257/417

(58) Field of Classification Search ........... 73/708, 73/706, 756; 257/417
See application file for complete search history.

(56) References Cited

U.S. PATENT DOCUMENTS

| | | | |
|---|---|---|---|
| 3,999,435 A | 12/1976 | Siegel | ............ 73/393 |
| 5,095,755 A | 3/1992 | Peterson | ............ 73/706 |
| 5,161,415 A * | 11/1992 | Kodama et al. | ............ 73/708 |
| 5,212,989 A * | 5/1993 | Kodama et al. | ............ 73/706 |
| 5,222,397 A * | 6/1993 | Kodama | ............ 73/756 |
| 5,266,827 A * | 11/1993 | Kato | ............ 257/417 |
| 5,436,491 A | 7/1995 | Hase et al. | ............ 257/417 |
| 6,612,177 B1* | 9/2003 | Boehler et al. | ............ 73/715 |
| 6,681,637 B1* | 1/2004 | Jacob et al. | ............ 73/708 |
| 6,698,294 B1* | 3/2004 | Jacob et al. | ............ 73/708 |

FOREIGN PATENT DOCUMENTS

| | | |
|---|---|---|
| DE | 25 31 787 | 7/1975 |
| DE | 76 03 126 | 7/1976 |
| DE | EP 0 764 839 | 9/1995 |

* cited by examiner

*Primary Examiner*—Edward Lefkowitz
*Assistant Examiner*—Andre Allen
(74) *Attorney, Agent, or Firm*—O'Shea, Getz & Kosakowski, P.C

(57) ABSTRACT

The invention relates to a pressure transmitter for an overload-proof pressure gauge, comprising a base body, a separating membrane disposed on a pressure-sensitive side of the pressure transmitter and subjectable to a pressure to be measured, a communicating chamber located inside said base body, which receives a pressure transmission medium, said chamber being closed on the pressure-sensitive side by the separating membrane, wherein the coefficient of thermal expansion of the pressure transmission medium is established in such a way that a temperature-induced change in the volume of the communicating chamber equals a temperature-induced change in the volume of the pressure transmission medium.

10 Claims, 1 Drawing Sheet

PRESSURE TRANSMITTER

BACKGROUND OF THE INVENTION

The present invention relates to the field of pressure transducers, and in particular to the field of pressure transducers that include a temperature compensated pressure transmitter and a pressure sensor.

Typically, pressure-measuring devices consist of a pressure transmitter and a pressure sensor coupled with the pressure transmitter. The pressure transmitter is subjected externally to a pressure, which is coupled to and measured by the pressure sensor. The pressure transmitter often serves to protect the extremely sensitive pressure sensor. The pressure transmitter includes a separating membrane that seals off the pressure transmitter, and which together with a base body of the pressure transmitter defines a chamber that contains a pressure-transmitting medium. The materials of the base body and the separating membrane that together form the chamber typically have significantly lower coefficients of thermal expansion than the pressure-transmitting medium. Because of this difference, temperature changes in the environment lead to differing expansions in the base body, the separating membrane, and the pressure-transmitting medium. This often results in relatively large measurement errors.

To reduce these temperature-induced measurement errors, pressure transmitters have been designed that have a separating membrane with a comparatively large surface area on the process side. Alternatively or additionally, the volume of the pressure-transmitting medium in the chamber is reduced. However, the volume of the pressure-transmitting medium cannot be reduced at will because of the desired measuring range of the pressure sensor or its measurement tolerances. Moreover, a pressure transmitter with a very small separating membrane diameter is often required, since space considerations alone often place limits on the size of the separating membrane in terms of area.

GM 76 03 126 describes a pressure transmitter in which an equalizing part with a minimal expansion coefficient is built into the chamber of the base body of the pressure transmitter to compensate for the volume expansion of the pressure-transmitting medium. However, such a pressure transmitter is extremely difficult to produce. In addition, adjusting this temperature-compensated pressure transmitter to provide exact setting of the proportions of the pressure-transmitting medium and the equalizing body is extremely expensive. Finally, particularly with pressure gauges for measuring pressures in the millibar range, it is necessary for the pressure transmitter to transmit the pressure received from the outside reliably and evenly to the pressure sensor downstream thereof. However, with the pressure transmitter described in GM 76 03 126, in which the equalizing part floats freely in the chamber, this is not possible or is possible only to a limited extent.

Therefore, there is a need for a temperature compensated pressure transmitter for use in a pressure transducer.

SUMMARY OF THE INVENTION

Briefly, according to an aspect of the present invention, a pressure transmitter includes a base body having a peripheral wall, and a separating membrane attached to the separating wall to form a chamber between the base body and the membrane. A pressure transmitting medium is contained within the chamber. The coefficients of thermal expansion of the separating membrane and of the base body, and the coefficient of thermal expansion of the pressure-transmitting medium are such that a temperature-induced volume change in the chamber at least approximately the same as a temperature-induced volume change in the pressure-transmitting medium.

Advantageously, optimal temperature compensation of the pressure transmitter and hence of the pressure gauge is achieved in a simple manner. An advantage of the pressure transmitter according to the invention is that the pressure transmitter head does not have to be enlarged to produce the temperature compensation. Moreover, no additional expensive manufacturing process steps are required. Once a pressure transmitter is specified—namely over the appropriate selection of coefficients of thermal expansion the compensating volume of the separating membrane and the volume increase in the pressure-transmitting medium offset each other—no additional manufacturing steps are necessary when manufacturing the pressure transmitter.

The separating membrane may have a corrugated shape of the radially outer areas of the separating membrane. As the temperature increases, the corrugation of the separating membrane decreases, leading to an increase in the volume of the chamber—the so-called compensating volume. The corrugation allows the compensation to be intentionally set for a given temperature-induced increase in volume.

The head of pressure transmitter may have a round cross section of the separating membrane. Of course, separating membranes with other shapes for the pressure transmitter head can also be made, for example oval, hexagonal, or square, but the round shape is by far the most accurate, especially for pressure measurement in the millibar range. Accordingly, advantageous fully compensated pressure transmitters can be produced whose separating membranes have a diameter of less than 40 mm.

Typically, the base body and the separating membrane are made at least partially of a corrosion-resistant metal material. High-grade steel is preferably used. It would be possible, however, for the separating membrane and/or the base body to be made of a ceramic or ceramic-like material. An oil, for example a hydraulic oil or silicone oil, is typically used as the pressure-transmitting medium. However, any other liquid or even a gas may be used.

The base body and the separating membrane typically have coefficients of thermal expansion that are far smaller than the pressure-transmitting medium. Usually the coefficient of thermal expansion is in the range of $10-100 \cdot 10^{-6}$ $K^{-6}$ for a temperature range of 20–100° C. and is hence smaller by a factor of 10 to 1000 than that of the pressure-transmitting medium.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
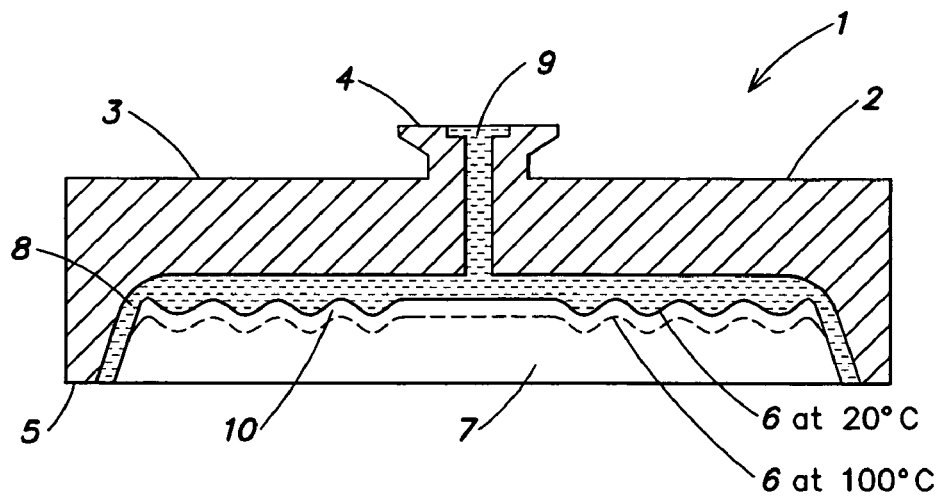
FIG. 1 is a partial section view of a first embodiment of a pressure transmitter.

FIG. 1 is a partial section through a pressure transmitter 1, of a pressure gauge. The pressure transmitter 1 includes a metal pressure transmitter base body 2, which preferably includes a corrosion-proof oxidation-resistant material. However, the base body 2 may include at least partially another material such as for example a ceramic material. On a sensor side 3, the base body 2 has a flange 4 that connects the pressure transmitter 1 with a pressure sensor (not shown).

On a process side 5, the pressure transmitter 1 has a separating membrane 6 disposed in a recess 7 formed in base body 2. The membrane 6 is disposed in the recess 7 in such a way that a chamber 8 is formed between the membrane 6 and the base body 2. In addition, the base body 2 of the pressure transmitter 1 has a hole 9 connected with the chamber 8 and with the flange 4. A pressure-transmitting medium (e.g., an oil) is located in the communicating chamber 8 and the hole 9. The membrane 6 separates medium on the process side (not shown in the figure) from the pressure-transmitting medium inside the communicating chamber 8. A pressure applied to the process side is transmitted to the pressure-transmitting medium via the separating membrane 6, and hence to the pressure sensor downstream.

The head of the pressure transmitter 1, and hence the membrane 6, are essentially circular in cross section in the present example. The membrane 6 has a corrugated shape at least in the radially outer areas of the separating membrane 6.

The base body 2 of the pressure transmitter 1 and the separating membrane 6 include material that typically has a much lower coefficient of thermal expansion than the pressure-transmitting medium within the chamber 8. With fluctuating temperatures, the membrane 6 is compressed or stretched radially. If the temperature increases for example from T=20° C. to T=100° C., the membrane 6 is stretched (see dashed line in FIG. 1) so that the volume of the chamber 8 increases. However, if the temperature decreases, the membrane 6 is compressed, reducing the volume of the chamber 8. A compensating volume 10 results from the volume difference between the compressed and the stretched membrane 6. When the temperatures increase and decrease, the pressure-transmitting medium increases and decreases in volume, and so does the above-mentioned oil fill.

According to an aspect of the invention, the total volume of the pressure-transmitting medium as well as the coefficients of thermal expansion of the materials of which the base body 2 and the membrane 6 are adjusted such that the temperature-induced change in the volume of the pressure-transmitting medium is the same, or at least approximately the same, as a temperature-induced change in the compensating volume 10. As a result, the pressure transmitter 1 is temperature-compensated over wide ranges. That is, the closed hydraulic or pneumatic system of the pressure transmitter 1 is temperature-compensated due to corresponding increases in volume of the pressure-transmitting medium and the communicating chamber 8, 9.

The temperature dependence of the pressure transmitter 1 can be reduced to nearly zero by the following measures, which can be taken even in very small measuring ranges of approximately 100 mbar. First, the temperature dependence can be adjusted by an appropriate material combination of the base body 2 and the separating membrane 6, for example by appropriately choosing their thermal expansion coefficients. Alternatively or additionally, the temperature dependence of the pressure transmitter 1 can be further reduced by a suitable shape of the separating membrane 6.

In addition, it is especially advantageous for the separating membrane 6 to be concave for example at a low temperature (e.g., T=20° C.) and assume an increasingly convex shape at increasing temperatures (e.g., T=100° C.). Of course, all other measures for reducing the temperature dependence are possible and advantageous, for example reducing the volume of the pressure-transmitting medium, enlarging the surface area of the separating membrane 6, and reducing the distance between the pressure transmitter 1 and the downstream pressure sensor as far as possible. Thus, in broad ranges, optimum temperature compensation of the pressure transmitter and hence of the pressure gauge can be achieved by these measures.

Figure 2:
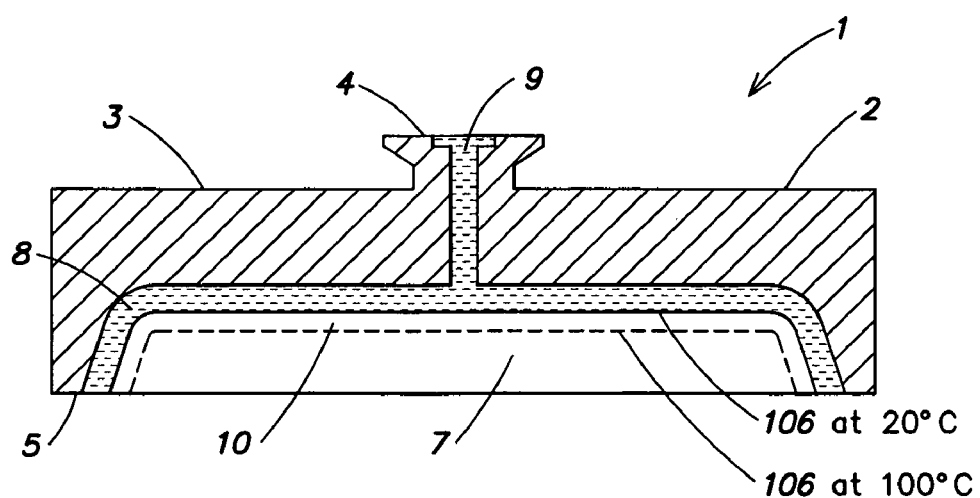
FIG. 2 is a partial section view of a second embodiment of a pressure transmitter.

FIG. 2 is a section through a pressure transmitter 100. The embodiment illustrated in FIG. 1 is substantially the same as the embodiment in FIG. 1, with the principal exception that the pressure transmitter includes a separating membrane 106 that is not corrugated in its outer area, but is straight. Overall, the separating membrane 106, shown once again at T=20° C. (solid line) and at T=100° C. (dashed line) has the shape of a pot.

Although the present invention has been shown and described with respect to several preferred embodiments thereof, various changes, omissions and additions to the form and detail thereof, may be made therein, without departing from the spirit and scope of the invention.

What is claimed is:

1. Pressure transmitter for a pressure gauge, comprising:
   a base body,
   a separating membrane disposed on a pressure-sensitive side of the pressure transmitter and subjectable externally to a pressure to be measured,
   a communicating chamber inside the base body, said chamber accepting a pressure-transmitting medium and being sealed on the pressure-sensitive side by the separating membrane,
   characterized in that the coefficients of thermal expansion of the separating membrane and of the base body and the coefficient of thermal expansion of the pressure-transmitting medium are established such that a temperature-induced volume change in the communicating chamber is the same or at least approximately the same as a temperature-induced volume change in the pressure-transmitting medium.

2. The pressure transmitter of claim 1, wherein at least part of the separating membrane has a corrugated shape, the corrugation of the separating membrane decreasing with increasing temperature.

3. The pressure transmitter of claim 2, wherein the separating membrane is in the shape of a pot.

4. The pressure transmitter of claim 2, wherein the separating membrane has a round cross section with a diameter of less than about 40 mm.

5. The pressure transmitter of claim 1, wherein the base body and/or the separating membrane is/are at comprises corrosion-resistant metal.

6. The pressure transmitter of claim 1, wherein the pressure-transmitting medium comprises oil, preferably a hydraulic oil or a silicone oil.

7. The pressure transmitter of claim 1, wherein the base body and/or the separating membrane has/have temperature expansion coefficients that are smaller by a factor of 10 to 1000 than that of the pressure-transmitting medium.

8. The pressure transmitter of claim 1, wherein the base body and/or the separating membrane has/have temperature expansion coefficient in the range of $10$–$100 \times 10^{-6}$ $K^{-6}$ for a temperature range of 20–100° C.

9. A pressure transmitter for use in a pressure transducer, said pressure transmitter comprising:
- a base body having a peripheral wall;
- a separating membrane attached to the peripheral wall to form a chamber between said base body and said membrane; and
- a pressure transmitting medium contained within said chamber;
- wherein coefficients of thermal expansion of said separating membrane and said base body, and the coefficient of thermal expansion of said pressure transmitting medium are such that a temperature-induced volume change in said chamber is at least approximately the same as a temperature-induced volume change in said pressure transmitting medium.

10. A pressure transmitter, comprising:
- a base body having a peripheral surface;
- a membrane attached to the peripheral surface to form a chamber between said base body and said membrane; and
- a medium contained within said chamber;
- wherein coefficients of thermal expansion of said membrane, said base body, and said medium are such that a temperature-induced volume change in said chamber is at least approximately the same as a temperature-induced volume change in said medium.

* * * * *